United States Patent
Miller et al.

[11] Patent Number: 6,019,346
[45] Date of Patent: Feb. 1, 2000

[54] PIEZO-ACTUATED HIGH RESPONSE VALVE

[76] Inventors: Kenneth L. Miller, 19933 Beechwood St., South Bend, Ind. 46637; Stephen M. Emo, 29342 River Shore Estates, Elkhart, Ind. 46516

[21] Appl. No.: 09/036,185

[22] Filed: Mar. 6, 1998

[51] Int. Cl.[7] ................................................ F16K 31/02
[52] U.S. Cl. ........................ 251/129.06; 251/129.03; 251/129.08; 251/331; 137/625.33; 137/625.28
[58] Field of Search ................. 251/129.03, 129.06, 251/129.08, 331; 137/625.33, 625.28

[56] References Cited

U.S. PATENT DOCUMENTS

| | | | |
|---|---|---|---|
| 3,174,716 | 3/1965 | Salter | 251/129 |
| 4,318,023 | 3/1982 | O'Neill et al. | 310/328 |
| 4,396,037 | 8/1983 | Wilcox | 137/162.65 |
| 4,437,644 | 3/1984 | Wilmers | 251/11 |
| 4,474,212 | 10/1984 | Schmitz | 137/614.11 |
| 4,538,642 | 9/1985 | Schutten et al. | 251/129.15 |
| 4,545,561 | 10/1985 | Brown | 251/129.08 |
| 4,610,426 | 9/1986 | Brandner | 251/129.06 |
| 4,903,732 | 2/1990 | Allen | 137/625.65 |
| 5,031,841 | 7/1991 | Schafer | 239/585 |
| 5,203,537 | 4/1993 | Jacobs et al. | 251/129.06 |
| 5,237,968 | 8/1993 | Miller et al. | 123/90.11 |
| 5,354,032 | 10/1994 | Sims et al. | 251/129.06 |
| 5,628,411 | 5/1997 | Mills et al. | 209/644 |

FOREIGN PATENT DOCUMENTS 3150805  7/1982  Germany.
4306072  9/1994  Germany.

*Primary Examiner*—Kevin Shaver
*Assistant Examiner*—Eric Keasel
*Attorney, Agent, or Firm*—Larry J. Palguta

[57] ABSTRACT

A high response valve (10) has a leaf spring (25) preloaded and positioned over an orifice plate (23). The orifice plate (23) has a plurality of interleaved ridges (62, 64) and grooves (61, 63, 65) with the grooves being in continuous communication with a valve inlet (13, 19). A plurality of slits or openings (49, 51) in the aperture plate (23) are in continuous communication with a valve outlet (21), each opening (49, 51) passing through a corresponding ridge (62, 64). A pair of electromechanical transducers (27, 29), each comprising a generally cylindrical stack of piezo-electric disks having a central axis (71), actuate the valve (10). One end of each stack (27, 29) is adjustably fixed relative to the housing by adjustment screws (41, 43), and a cap (35, 37) at the other end of the stack couples the stack to a corresponding spring (25) end. Each cap (35, 37) includes a notch (39) for engaging and maintaining a corresponding spring end near the corresponding central axis (71). Energization of the piezo-electric stacks (27, 29) applies an additional axial load to the spring (25) and proportionally opens the flow area of the valve (10). The high mechanical forces available from a piezoelectric actuator permits the construction of very stiff systems with high natural response frequencies, and the plurality of openings (49, 51) provide an effectively large total flow area.

20 Claims, 3 Drawing Sheets

PIEZO-ACTUATED HIGH RESPONSE VALVE

The present invention relates generally to valves and more particularly to electrically enabling valves for passing selectively a fluid such as air or a similar gaseous material. In particular, the present invention relates to a rapid response piezo-electrically actuated fluid passing valve. One preferred application of the valve of the present invention is as an air injection valve for active compressor stabilization control in a turbine engine.

Active compressor stabilization control in a turbine engine may include the use of several air valves located about the annulus of the engine compressor. Temperatures in such an environment may run 500 to 600 degrees Celsius. Also, desirably, the opening and closing rate of such valves should be on the order of ½ kHz. to 2 kHz. However, typical available valves are capable of operating only up to about 500 times in one second.

U.S. Pat. No. 3,174,716 suggests the use of a bowed spring for variably restricting a pressure port in response to magnetostrictively generated changes in the location of one end of the spring. This patent also suggests magnetostrictively generated changes in the separation between the ends of a bowed spring to control the opening and closing of a pair of electrical contacts. The patent points out that the bow spring amplifies the relatively small magnetostrictively generated dimensional changes to allow practical use of those changes. This valve arrangement is limited to operating temperatures below 300 degrees Celsius and is not capable of meeting the above noted temperature requirements. Moreover, magnetostrictive actuators require the continuous application of power to maintain their activated position. Additionally, the gain of magnetostrictive materials decreases significantly with increasing temperature. Finally, the overall life of the spring element is shortened by the preloading required by the magnetostrictive actuator.

It is desirable to provide a short path length and a large area aperture between inlet and outlet plenums of a valve. It is further desirable to create a high rigidity, low inertia, and therefor, rapidly responding, valve configuration. Also, it is desirable to provide a valve actuation mechanism that does not require power input to hold a static position. Temperature independence or an increase in gain with temperature in a high temperature application is also desirable for the actuator.

The present invention provides solutions to the above problems by providing a multiple aperture valve orifice to provide a relatively large orifice area, and using the high response and force available from piezo-electric materials coupled with a valve design that has a high natural frequency. The behavior of piezo-electric materials is similar to a capacitor. Neglecting leakage, at a fixed charge, the length or position is held constant without additional power input. Some piezo-electric materials additionally exhibit the desired temperature characteristics.

In accordance with one form the invention, a high temperature application rapid response air valve which is operable between open and closed conditions includes an aperture plate having a plurality of alternating ridges and grooves with a plurality of openings passing through the ridges in the aperture plate. An aperture closure arrangement includes a bent leaf spring having a pair of opposed ends, and a spring surface normally resting on the ridges to sealingly cover the ridge openings when the valve is in its closed condition. There is a pair of elongated electromechanical transducers each engaging one spring end and operable when energized to force the spring ends toward one another to deform the leaf spring thereby moving the leaf spring surface away from the ridge openings and the valve into its open positions. The electromechanical transducers are preferably generally cylindrical stacks of piezo-electric disks with one stack end adjustably supported by a valve housing and a wear resistant cap at the other end of the stack coupling the stack to a corresponding spring end. The cap may include a notch or similar structure for engaging and maintaining a corresponding spring end near the cylinder axis.

The present invention comprises a valve having a housing with an inlet and an outlet, and operable to pass fluid selectively from the inlet to the outlet comprising:

an aperture plate having a plurality of alternating ridges and grooves with the grooves being in continuous communication with the inlet;

a plurality of openings in the aperture plate in continuous communication with the outlet, each opening passing through a corresponding ridge; and means for activating the valve and operable between a closed position where fluid flow from the inlet into the openings is blocked and at least one open position allowing fluid flow from adjacent grooves into the opening of an intervening ridge.

Corresponding reference characters indicate corresponding parts throughout the several views of the drawings.

Figure 2:
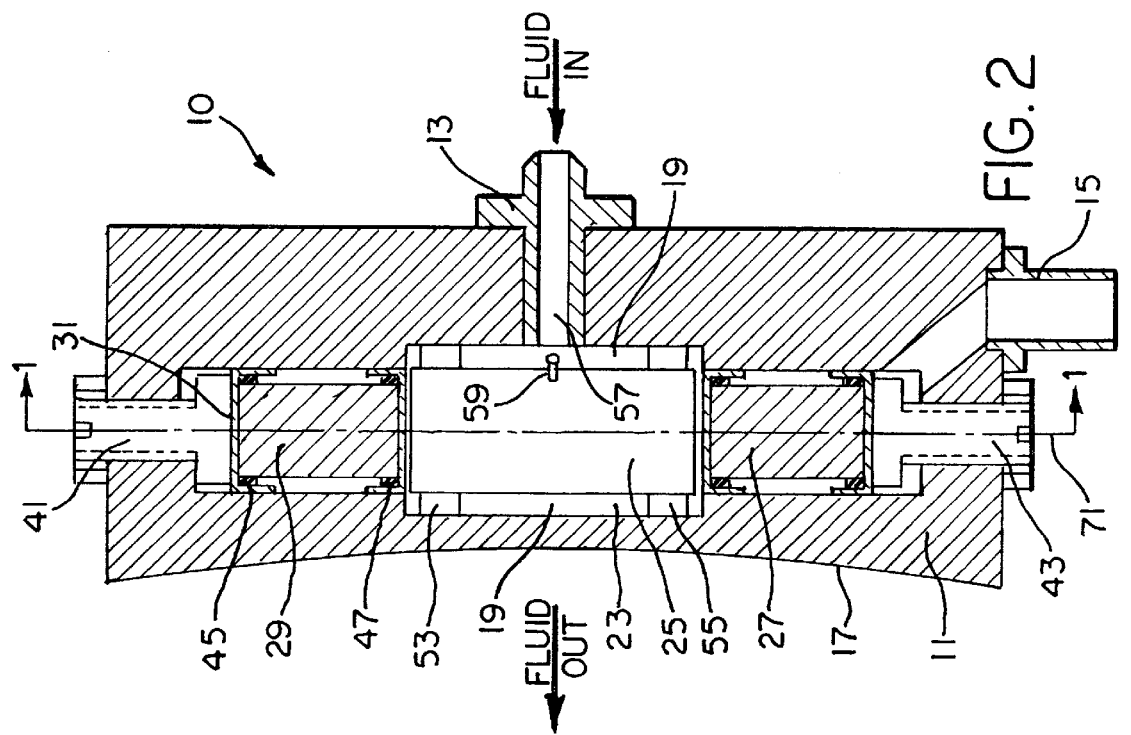
FIG. 2 is a view in cross-section along the line 2—2 of FIG. 1.
Figure 1:
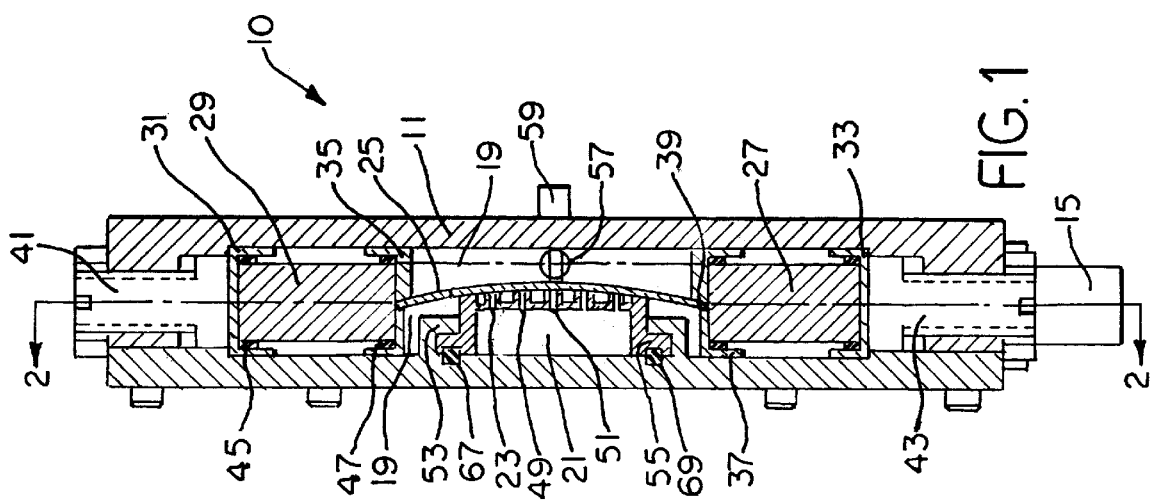
FIG. 1 is a cross-sectional view of a high response valve according to one form of the invention.
Figure 6:
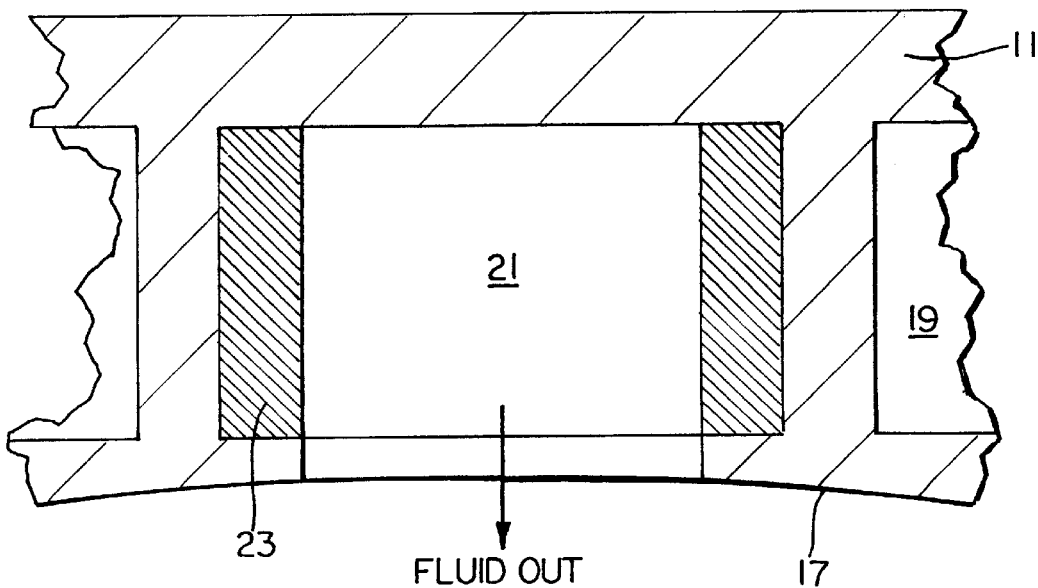
FIG. 6 is a cross-sectional view along line 6—6 of FIG. 3.

In FIGS. 1 and 2, a valve body 11 of valve 10 has a high pressure air inlet 13 which admits air into an inlet chamber or plenum region 19 via passageway 57. There is an outlet chamber or plenum region 21 within the valve body which is separated from the inlet plenum by a preloaded leaf spring 25 which selectively engages sealingly an orifice plate 23. The only fluid path between the inlet 19 and outlet 21 plenums is through the orifice plate 23 and that path is selectively blocked by the leaf spring 25. A concave side 17 of the valve body 11 is contoured to fit against an outer wall portion of an engine compresor annulus and includes an outlet port visible only in FIG. 6 which selectively passes air from the discharge plenum 21 to the engine.

A pair of cylindrical or rectangular shaped stacks 27 and 29 of disc-shaped piezo-electric elements are located between end caps or cups 33 and 37, and 31 and 35 respectively. The view line 1—1 of FIG. 2, in addition to indicating the line along which the section of FIG. 1 is taken, also indicates a center line 71 of cylindrical symmetry for the piezoelectric stacks, cups and certain other components. A pair of seals (for example, O-rings), such as 45 and 47, support each of the cylindrical stacks, such as stack 29, to guard against the application of detrimental radial shear forces to the stack. The axial location of the end cups 31 and 33, as well as the bend of leaf spring 25 to insure a good seal, is determined by a pair of adjustment screws 41 and 43. The edges of the leaf spring 25 are held captive between the cup-shaped inserts or cups 35 and 37. Thus, for example, turning the adjustment screw 41 inwardly will move the cup 31, stack 29, and cup 35 toward the center of the valve and apply an increased axial force to leaf spring 25 which tends to increase the flexure of that leaf spring away from the orifice plate 23. Modest adjustments merely regulate the force exerted against the orifice plate 23 by the leaf spring 25 while a more gross adjustment can raise the spring 25 from the plate 23 thereby opening valve 10.

Figure 4:
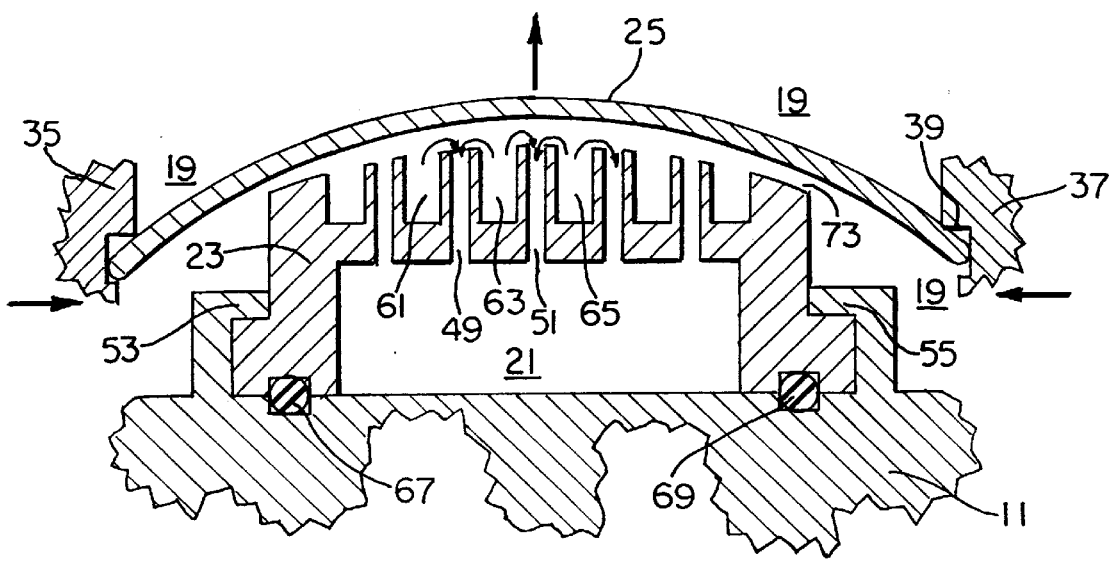
FIG. 4 is an enlarged cross-sectional view similar to FIG. 3, but showing the valve in an "open" position.

Direct current power is selectively applied to each of the disks in the piezo-electric stacks 27 and 29 by way of electrical connector 15. When energized, the stacks extend axially to apply an additional axial load to the leaf spring 25 causing that spring to flex away from orifice plate 23 as illustrated by the arrows in FIG. 4. The separation between the orifice plate 23 and the leaf spring 25 in FIG. 4 is exaggerated. In one implementation, a separation of about 0.012 inches was employed to open fully valve 10.

To minimize wear problems which might be caused by the relatively hard spring 25, the cups 35 and 37 may be inserts of a hard bearing material such as Carboloy®. Some thermal compensation may be achieved by forming the cups 31 and 33 of an alloy of stainless steel and Invar® (an iron-nickel low coefficient of thermal expansion material). The individual piezo-electric disks may be formed of a Lead Niobate ceramic material and are connected in parallel while the two cylindrical stacks may be either series or parallel connected. The position of the leaf spring 25, and thus the open or closed condition of the valve, may be monitored by a sensor such as the linear variable differential transformer (LVDT) 59 or proximity sensor, or other similar device if desired.

Figure 3:
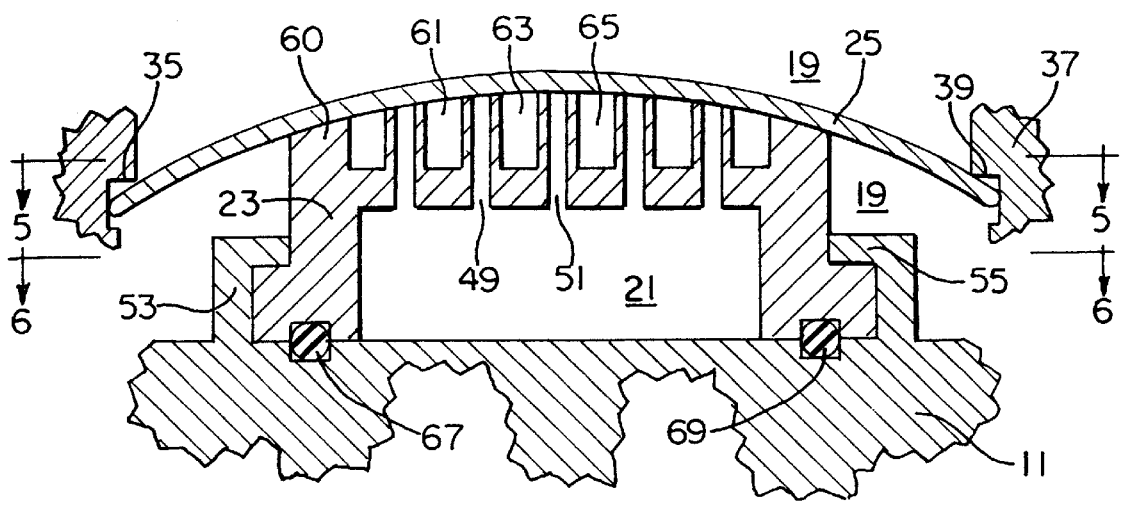
FIG. 3 is an enlarged cross-sectional view taken from the lower central portion of FIG. 1.
Figure 5:
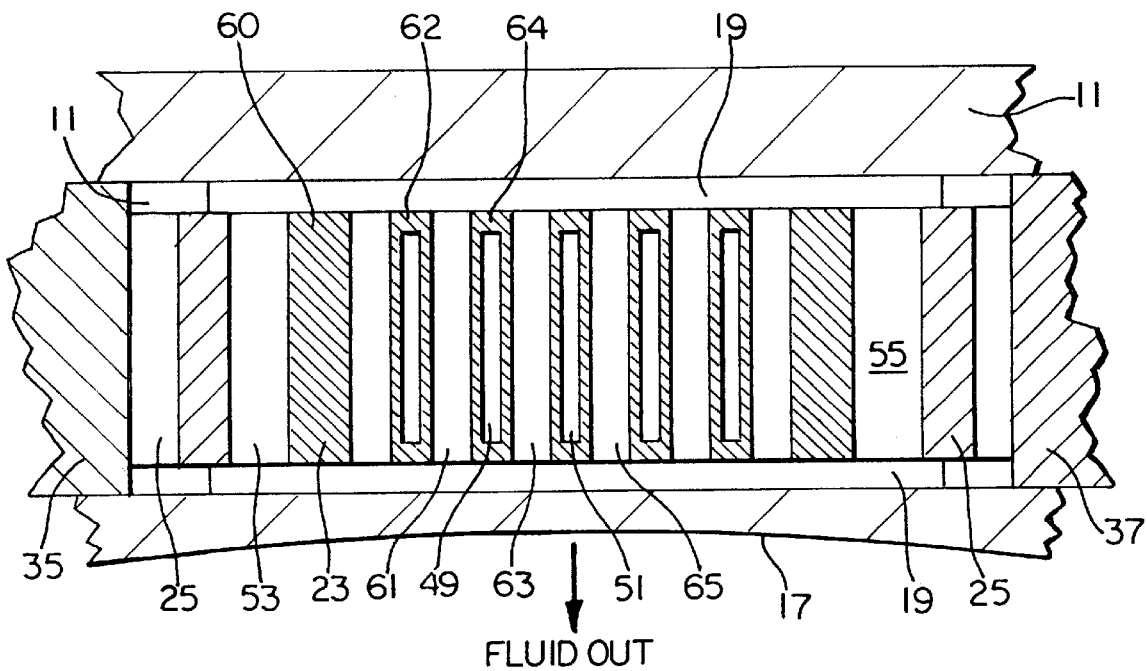
FIG. 5 is a cross-sectional view along line 5—5 of FIG. 3.

Referring now primarily to FIGS. 3 and 4, the orifice plate 23 is clamped against a pair of seals 67 and 69 by the tabs 53 and 55 of housing 11. Orifice plate 23 is seen to include a series of slits, apertures or openings such as 49 and 51 which open into the outlet plenum 21. In FIG. 3, these slits are prevented from communicating with the inlet plenum 19 by leaf spring 25. As best seen in FIG. 5, a series of slots or troughs such as 61, 63 and 65 are in continuous communication with the inlet plenum 19. When either of the piezo-electric stacks 27 and 29 are energized, the cups 35 and/or 37 are forced axially toward one another as indicated by the arrows in FIG. 4 applying an additional axial load to leaf spring 25 causing that spring to flex away from the orifice plate 23. As viewed in FIGS. 3 and 4, the arc length of the spring is constant, however the cord length is smaller and the amount of flexing greater, in FIG. 4. Thus, the radius of curvature of the spring in FIG. 3 is greater than in FIG. 4. The movement of the leaf spring in a direction generally orthogonal to the axis 71 (shown in FIG. 2) opens fluid paths, for example, from troughs 61 and 63 to the slit 49 and from troughs 63 and 65 to the slit 51 as illustrated by the small curved arrows in FIG. 4. The flow through the valve is linearly proportional to the energization of either one or both of the piezo-electric stacks 27 and 29. This is accomplished by having the following relationships between structural areas and pressure. First, the pressure drop across the valve always results in choked or restricted flow. Second, each aperture, such as 49 and 51 in FIG. 5, forms a curtain area that is defined as the circumferential or exterior distance around the aperture times the distance between the orifice plate 23 and the leaf spring 25. The cross-sectional area of the apertures and the cross-sectional areas of the troughs, such as 61, 63, 65 in FIGS. 3–5, are always greater than the curtain areas of the apertures. This feature of the valve results in the flow through the valve being proportional to the charge or energization of either one or both of the piezo-electric stacks. This feature differentiates the present invention from a simple on/off valve, and enables the use of the proportional valve of the present invention in an overall control system. If an onloff valve were utilized, the required frequency response would be too high to be practical, because the length of the flow passage becomes a limiting factor.

In FIG. 3, the ends of spring 25 rest against abutments or ledges such as 39. If the ends of the cups 35 and 37 were flat, a very slight increase in separation between those cups would allow the spring ends to slip somewhat vertically upwardly in FIG. 3 resulting in significant increase in the radius of curvature of spring 25 and creating potential leakage problems. Similarly, in FIG. 4, the potential for the spring 25 ends to slip downwardly reclosing the valve is avoided by making the ledge 39 part of a notch as shown. In some applications, this downward slippage may be allowed with the spring coming to rest against the corners such as 73 of the aperture plate 23. Since the radius of curvature of spring 25 is lessened in FIG. 4, the central portions of the aperture plate will remain open despite engagement at the corners such as at 73.

The slotted orifice plate 23 in FIG. 5 is seen to comprise a series of ridges such as 60, 62 and 64 interspersed with a series of grooves or troughs such as 61, 63 and 65. The troughs are in continuous communication with the inlet plenum 19. Certain ones of the ridges include slits or apertures such as 49 and 51 which are in continuous communication with the outlet plenum 21. When spring 25 flexes upwardly as in FIG. 4, the flow limiting area or effective valve aperture is the perimeter of each aperture containing ridge times the separation between the top of that ridge and the spring surface. Of course, each apertured ridge contributes to the flow limiting area so a relatively large area can be achieved with a relatively small spring deflection by employing a plurality of apertured ridges.

Over the range of operation, the spring deflection or vertical movement shown in FIG. 4 is substantially proportional to the axial deflection or decrease in cord length. This results in a change in orifice flow area which is directly proportional to the change in charge in the piezo-electric stacks. Also, a small axial displacement results in a large deflection at the center. The result is a very compact highly efficient valve structure.

The present invention is configured to provide a valve that effects air or fluid injection, or provides bypass or venting functions. The invention provides a high speed, low power, linearly variable, large orifice area valve that can operate over a wide temperature range of −55 degrees Celsius to over 500 degrees Celsius.

What is claimed is:

1. A valve having a housing with an inlet and an outlet and operable to pass fluid selectively from the inlet to the outlet comprising:
   an aperture plate having a plurality of alternating ridges and grooves with the grooves being in continuous communication with the inlet;
   a plurality of openings in the aperture plate in continuous communication with the outlet, each opening passing through a corresponding ridge; and
   means for activating the valve and operable between a closed position where fluid flow from the inlet into the openings is blocked and at least one open position allowing fluid flow from adjacent grooves into the opening of an intervening ridge.

2. The valve of claim 1, wherein the valve activating means comprises a leaf spring having a pair of opposed ends and a surface normally resting on the ridges and sealingly covering the openings when in the closed position.

3. The valve of claim 2, wherein said surface is a concave surface, relative to the aperture plate, in both the open and closed positions with the radius of curvature of the concave surface in the open position being less than the radius of curvature of the concave surface in the closed position.

4. The valve of claim 2, wherein the valve activating means further comprises a pair of elongated electromechanical transducers each engaging a spring end and operable when energized to force the spring ends toward one another to deform the leaf spring and thereby move the concave surface away from the openings.

5. The valve of claim 4, wherein each electromechanical transducer comprises a stack of piezo-electric elements each having one end adjustably fixed relative to the housing and a cap at the other end coupling the respective stack to a corresponding spring end.

6. The valve of claim 4, wherein each electromechanical transducer comprises a generally elongated stack of piezo-electric disks having a central axis with one end of the stack adjustably fixed relative to the housing, and a cap at the other end of the stack coupling the stack to a corresponding spring end, the cap including a notch for engaging and maintaining a corresponding spring end near the corresponding central axis.

7. The valve of claim 3, wherein the leaf spring is flexurally preloaded in the closed position.

8. The valve of claim 1, wherein the valve effects a fluid flow linearly proportional to energization of the activating means.

9. A valve having a housing with an inlet and an outlet, and operable to pass fluid selectively from the inlet to the outlet comprising:

at least one aperture in continuous communication with the inlet; and means for activating the aperture and operable between a closed position where fluid flow from the inlet through the aperture to the outlet is blocked and at least one open position allowing fluid flow from the inlet through the aperture to the outlet;

the aperture activating means including a leaf spring having a pair of opposed ends and a surface normally resting against and closing sealingly the aperture when in the closed position, and a pair of elongated electromechanical transducers each engaging one spring end and operable when energized to force the spring ends toward one another to deform the leaf spring thereby moving the leaf spring surface away from the aperture.

10. The valve of claim 9, wherein the valve effects a fluid flow linearly proportional to energization of the activating means.

11. The valve of claim 9, wherein each electromechanical transducer comprises a stack of piezo-electric elements each having one end adjustably fixed relative to the housing and a cap at the other end coupling the respective stack to a corresponding spring end.

12. The valve of claim 9, wherein each electromechanical transducer comprises a generally cylindrical stack of piezo-electric disks having a central axis with one end of the stack adjustably fixed relative to the housing, and a cap at the other end of the stack coupling the stack to a corresponding spring end, the cap including a notch for engaging and maintaining a corresponding spring end near the corresponding central axis.

13. The valve of claim 9, wherein the leaf spring is flexurally preloaded in the closed position.

14. The valve of claim 9, wherein said leaf spring surface is a concave surface, relative to the aperture, in both the open and closed positions with the radius of curvature of the concave surface in the open position being less than the radius of curvature of the concave surface in the closed position.

15. The valve of claim 9, wherein the aperture comprises:

an aperture plate having a plurality of alternating ridges and grooves with the grooves being in continuous communication with the inlet; and a plurality of apertures in the aperture plate in continuous communication with the outlet, each aperture passing through a corresponding ridge;

the aperture activating means operable in the open position to allowing fluid flow from adjacent grooves into the apertures of the intervening ridges.

16. The valve of claim 15, wherein each electromechanical transducer comprises a generally cylindrical stack of piezo-electric disks having a central axis with one end of the respective stack adjustably fixed relative to the housing, and a cap at the other end of the stack coupling the stack to a corresponding spring end, the cap including a notch for engaging and maintaining a corresponding spring end near the corresponding central axis, and wherein the leaf spring is flexurally preloaded in the closed position and said surface is concave in both the open and closed positions with the radius of curvature of the surface in the open position being less than the radius of curvature of the surface in the closed position.

17. A rapid response, proportional air valve operable between open and closed positions for high temperature applications comprising:

an aperture plate having a plurality of alternating ridges and grooves;

a plurality of openings in the aperture plate, each opening passing through an associated ridge;

means for activating the aperture plate including a preloaded leaf spring having a pair of opposed ends, and a surface normally resting on the ridges and covering sealingly the openings when in the closed position, and a pair of elongated electromechanical transducers each engaging one spring end and operable when energized to force the spring ends toward one another to deform the leaf spring and thereby move the surface away from the ridge openings and effect air flow proportional to the energization of the transducers.

18. The valve of claim 17, wherein each electromechanical transducer comprises a generally cylindrical stack of piezo-electric disks having a central axis with one end of the stack adjustably fixed relative to the housing, and a cap at the other end of the stack coupling the stack to a corresponding spring end, the cap including a notch for engaging and maintaining a corresponding spring end near the respective central axis.

19. A valve having a housing with an inlet and an outlet and operable to pass fluid proportionally from the inlet to the outlet comprising:

an aperture plate having a plurality of alternating ridges and grooves with the grooves being in continuous communication with the inlet;

a plurality of openings in the aperture plate in continuous communication with the outlet, each opening passing through a corresponding ridge; and means for activating the valve and operable between a closed position where fluid flow from the inlet into the openings is blocked and open positions allowing fluid flow from adjacent grooves into the opening of an intervening ridge, the fluid flow being proportional to energization of the activating means.

20. The valve of claim 19, wherein the activating means includes a leaf spring flexurally preloaded in the closed position.

* * * * *